(12) United States Patent
Yamamoto

(10) Patent No.: US 8,320,669 B2
(45) Date of Patent: Nov. 27, 2012

(54) IMAGE PROCESSING METHOD, IMAGE PROCESSING APPARATUS, IMAGE DATA COMPRESSION DEVICE, AND COMPUTER PROGRAM

(75) Inventor: Toshitsugu Yamamoto, Takatsuki (JP)

(73) Assignee: Konica Minolta Business Technologies, Inc. (JP)

( * ) Notice: Subject to any disclaimer, the term of this patent is extended or adjusted under 35 U.S.C. 154(b) by 523 days.

(21) Appl. No.: 12/666,328

(22) PCT Filed: Jun. 24, 2008

(86) PCT No.: PCT/JP2008/001631
§ 371 (c)(1),
(2), (4) Date: Dec. 23, 2009

(87) PCT Pub. No.: WO2009/001549
PCT Pub. Date: Dec. 31, 2008

(65) Prior Publication Data
US 2010/0177958 A1    Jul. 15, 2010

(30) Foreign Application Priority Data
Jun. 28, 2007   (JP) .................................. 2007-170359

(51) Int. Cl.
*G06K 9/00* (2006.01)
(52) U.S. Cl. ........................................ 382/166; 382/163
(58) Field of Classification Search .................. 382/166, 382/232–253
See application file for complete search history.

(56) References Cited

U.S. PATENT DOCUMENTS

| 5,608,851 A | 3/1997 | Kobayashi | 395/131 |
| 6,094,510 A * | 7/2000 | Yaguchi et al. | 382/232 |
| 6,917,704 B2 | 7/2005 | Kojima et al. | 382/166 |

(Continued)

FOREIGN PATENT DOCUMENTS

JP    06-124343    5/1994

(Continued)

OTHER PUBLICATIONS

Notification of Transmittal of Translation of the International Preliminary Report on Patentability and Written Opinion Translation mailed Feb. 4, 2010, concerning International Application No. PCT/JP2008/001631 filed on Jun. 24, 2008.

*Primary Examiner* — Jingge Wu
(74) *Attorney, Agent, or Firm* — Cantor Colburn LLP

(57) ABSTRACT

In image processing in which each small area included in color image data, which is represented by C, M, Y, and K, is expressed by a predetermined number of representative colors, values of color parameters are obtained for a small area from the values of the color parameters for C, M, Y, and K for each pixel in the small area, so that the values of the color parameters have degrees of variation being compensated to become smaller in the group as the value for black becomes larger. One color parameter to be targeted is selected (#104) based on the degree of variation in the values of individual color parameters in the group. A reference value to be used for grouping the pixels is obtained based on the relationship between the values of the color parameter to be targeted in the group and the quantities of pixels in the group. Based on the reference value, the pixels are divided into groups (#106), and a representative color for each group is obtained (#109).

14 Claims, 15 Drawing Sheets

U.S. PATENT DOCUMENTS

| | | | |
|---|---|---|---|
| 7,283,665 B2 * | 10/2007 | Suzuki | 382/166 |
| 7,286,702 B2 * | 10/2007 | Oohara | 382/167 |
| 7,409,083 B2 * | 8/2008 | Yano | 382/166 |
| 2008/0198393 A1 * | 8/2008 | Fujiwara et al. | 358/1.9 |
| 2008/0253647 A1 * | 10/2008 | Cho et al. | 382/164 |
| 2010/0061626 A1 * | 3/2010 | Ben-Moshe et al. | 382/163 |

FOREIGN PATENT DOCUMENTS

| | | |
|---|---|---|
| JP | 08-115405 | 5/1996 |
| JP | 2001-338284 | 12/2001 |
| WO | WO 2009/001549 | 12/2008 |

* cited by examiner (a)

|  | R | G | B |
|---|---|---|---|
| REGION B1 | 154 | 154 | 154 |
| REGION B2 | 34 | 34 | 34 |
| REGION B3 | 3 | 34 | 34 |

(b)

|  | L | R_G | B |
|---|---|---|---|
| REGION B1 | 154 | 142 | 154 |
| REGION B2 | 34 | 142 | 34 |
| REGION B3 | 18 | 127 | 34 |

(a)

BK

JS (b)

4 COLORS (c)

BK

2 BITS x 64 PIXELS + 24 BITS x 4 COLORS = 224 BITS

AVERAGE VALUE FOR EACH COLOR
COMPONENT IN GROUP GJ1

C = (4 PIXELS × 8 PIXELS × 0) ÷ (4 PIXELS × 8 PIXELS) = 0

M = (4 PIXELS × 8 PIXELS × 0) ÷ (4 PIXELS × 8 PIXELS) = 0

Y = (4 PIXELS × 8 PIXELS × 0) ÷ (4 PIXELS × 8 PIXELS) = 0

K = (4 PIXELS × 4 PIXELS × 120 + 4 PIXELS × 4 PIXELS × 240)
    ÷ (4 PIXELS × 8 PIXELS) = 180

(C, M, Y, K) = (0, 0, 0, 180)

AVERAGE VALUE FOR EACH COLOR
COMPONENT IN GROUP GJ2

(C, M, Y, K) = (230, 0, 0, 240)

IMAGE PROCESSING METHOD, IMAGE PROCESSING APPARATUS, IMAGE DATA COMPRESSION DEVICE, AND COMPUTER PROGRAM

RELATED APPLICATIONS

This application is a U.S. National Phase Application under 35 USC 371 of International Application PCT/JP2008/001631, filed Jun. 24, 2008, which claims priority to Japanese Patent Application No. 2007-170359, filed Jun. 28, 2007.

TECHNICAL FIELD

The present invention relates to an image processing method and apparatus for compressing image data.

BACKGROUND ART

Various methods have been used for compressing image data, and one of the methods is called "BTC" (Block Truncation Coding).

According to this method, image data (hereinafter, sometimes referred to simply as "image") is divided into a plurality of blocks, and pixels in individual blocks are expressed by approximated colors to reduce the number of colors in the individual blocks and to thereby reduce an amount of data.

For example, the following shows the specific process. First, an average value of density values of pixels in each divided block is obtained. Then, each of the pixels is classified into a group of pixels having density values higher than the average value and a group of pixels having density values lower than the average value. Further, for each of the groups, an average value of the density values for each of the color components such as R (Red), G (Green), and B (Blue) is obtained. Thereafter, a color expressed by the individual average values is determined as an approximated color (representative color) for each individual group. With this arrangement, an identical representative color is assigned to all the pixels in the same group. This process is repeated for all blocks included in the image data. As an art related to this kind of method, there is proposed a method disclosed in JP2001-338284A as described below.

According to the method disclosed in JP2001-338284A, a variance of each color (color component) is calculated for each small area (block) included in image data, and a color (color component) of which the variance is the largest is determined as a target color. An average value is obtained for this target color in each small area. Then, the pixels in each small area are divided into groups based on the average value. In other words, the pixels are divided into a group of pixels having a density higher than the average value and a group of pixels having a density lower than the average value. Next, an average value of density values for each color component of pixels in each of the groups is obtained. A color expressed as a result of this is determined as a representative color of each of the groups. Then, it is determined whether a quantity of representative colors thus decided is greater than a desired quantity of colors. If it is less than the desired quantity of colors, then further grouping is performed. If it is equal to or larger than the desired quantity of colors, then another small area will be processed.

As described above, according to the BTC, an image in a block is converted into an image having a smaller number of colors. As a result, by allowing a certain amount of degradation in image quality, the amount of data is reduced.

Hereinafter, a description will be given of a compression ratio according to the BTC with reference to FIG. 16. FIG. 16(a) illustrates a block BK having a size of 8 by 8 matrix of pixels. The block BK includes images represented by a line drawing portion JS and a background portion thereof. In this example, the line drawing portion JS and the background portion are expressed in blue (shown by hatching) and gradation in red fading gradually from a right-bottom portion toward a left-top portion.

In FIG. 16(a), if the image in the block BK is expressed by 24 bits of RGB color (8 bits for each color component), the amount of data of this image becomes 1536 bits resulting from 24 bits×64 pixels.

For example, when the image in this block is converted, by using the BTC, into an image illustrated in FIG. 16(c) expressed in four approximated colors which are depicted in FIG. 16(b), the amount of data will be as follows. Here, the four colors that are shown individually by two-bit numerals "00", "01", "10", and "11" are blue, light red, deeper red, and much deeper red, respectively.

The four approximated colors require the amount of data of 96 bits resulting from 24 bits×4 colors. Since there are four approximated colors, 2 bits are required to identify individual colors. Since there are 64 pixels (8 by 8) in the block BK, 128 bits resulting from 2 bits×64 pixels are required to associate representative colors to individual pixels in the block BK. As a result, the converted image can be expressed by 224 bits which is a result of 96 bits+128 bits. In this example, the amount of data before conversion, i.e., 1536 bits, is compressed into the amount of data after conversion, i.e., 224 bits, achieving a compression ratio of about 14.6%.

This compression ratio becomes larger as the quantity of the approximated colors are reduced or the size of the block is made larger. FIG. 17 illustrates a relationship between the size of the block and the compression ratio. It is important to properly select the representative colors from the block for performing effective compression.

DISCLOSURE OF THE INVENTION

Here, a description is given of a case in which a block BK as illustrated in FIG. 18(a) is subjected to image conversion using the BTC. As illustrated in FIG. 18(a), the block BK is a block having a size of 8 by 8 matrix of pixels. In the block BK, colors of individual pixels are expressed in 256 gray levels by four colors of C (Cyan), M (Magenta), Y (Yellow), and K (Black). The block BK includes a region B1 (gray) having gray levels of "0", "0", "0", and "120" for C, M, Y, K, respectively; a region B2 (blackish gray) having gray levels of "0", "0", "0", and "240" for C, M, Y, K, respectively; and a region B3 (blackish but bluish color) having gray levels of "230", "0", "0", and "240" for C, M, Y, K, respectively. Since the regions B2 and B3 have higher densities of K, the depth of the color is stronger when compared with the region B1. For this reason, if the image in the block BK is converted into an image represented by two approximated colors, it is desirable to assign an identical approximated color to the regions B2 and B3 so as not to degrade the image quality in order to obtain such an image as illustrated in FIG. 18(b).

However, when the method described in JP2001-338284A is applied to the block BK, it will be processed as described below. A color component having a highest degree of variance is decided among C, M, Y, and K by calculating degrees of variance in the block BK for C, M, Y, and K. In FIG. 18(a), the color component C is determined to show the highest degree of variance based on the densities of individual color components in each region. Accordingly, the color component C is chosen as a target color.

The average value of gray levels for C in the block BK becomes "115" (4 pixels×8 pixels×230÷64 pixels). As illustrated in FIG. 19(a), when grouping is performed for the color component C based on "115" as a reference, the pixels are divided into a group GJ1 of pixels formerly included in the regions B1 and B2 and a group GJ2 of pixels formerly included in the region B3. Further, average values of gray levels are obtained for individual color components in each group, and the resultant value is determined as a representative color for that group. Then, the image in the block BK is converted into an image expressed by the average values thus obtained. In this example, the average values for individual color components in each group are illustrated in FIG. 20. According to this result, the image in the block BK is converted into an image as illustrated in FIG. 19(b).

In this way, when the method disclosed in JP2001-338284A is applied to an image expressed by C, M, Y, and K, the pixels in the block may not be divided into groups as desired depending on the image in the divided block BK, which may result in lowering the image quality unnecessarily.

In view of the foregoing problem, it is an object of the present invention to prevent an image quality from lowering than conventionally possible in image processing in which an amount of data is reduced by reducing the number of colors used in image data that is expressed by C, M, Y, and K colors.

The image processing method according to one aspect of the present invention is a method by which each small area including pixels within a color image is expressed by a predetermined or smaller number of representative colors, and includes the following steps: an obtaining step that obtains values of individual color parameters for cyan, magenta, yellow, and black by which each pixel is expressed; a value calculation step for obtaining values of individual post-conversion color parameters from the values of the individual color parameters for cyan, magenta, yellow, and black, the values of the individual post-conversion color parameters each having a degree of variation being compensated to become smaller as the value of the color parameter for black becomes larger; a selection step for selecting one post-conversion color parameter to be targeted with respect to the pixels included in the small area based on variation values, which indicate degrees of variation in the small area, of the values of the individual post-conversion color parameters obtained in the value calculation step; a reference value calculation step for obtaining a reference value to be used for grouping the pixels based on the value of the post-conversion color parameter to be targeted in the small area; a grouping step for grouping the pixels included in the small area based on the reference value obtained in the reference value calculation step; and a representative color calculation step for obtaining a representative color for each group in the small area based on the values of the individual color parameters for pixels belonging to said each group.

Preferably, in the reference value calculation step, if there is a specific value of a post-conversion color parameter whose corresponding quantity of pixels is "0" in a relationship between the values of the post-conversion color parameter to be targeted and quantities of pixels in the small area, the relationship covering a minimum value through to a maximum value of the post-conversion color parameter to be targeted, said specific value is obtained as the reference value.

Alternatively, there are provided a second selection step for selecting a group to be targeted and a post-conversion color parameter to be targeted based on variation values in each group of the small area with respect to the values of the individual post-conversion color parameters obtained in the value calculation step; a second reference value calculation step that, if there is a particular value of a post-conversion color parameter whose corresponding quantity of pixels is "0" in a relationship between the values of the post-conversion color parameter to be targeted and quantities of pixels in the group to be targeted, the relationship covering a minimum value through to a maximum value of the post-conversion color parameter to be targeted, said particular value is obtained as a second reference value; and a second grouping step for grouping the pixels included in the group to be targeted based on the second reference value obtained in the second reference value calculation step. In the representative color calculation step, the representative color is obtained for each group in the small area after the second grouping step is performed.

In the selection step and the second selection step, the variation values are obtained by performing weighting in such a way that the variation values become larger for a post-conversion color parameter whose color changes greatly as a result of a change in a value of the post-conversion color parameter, and said selecting is performed based on the variation values thus obtained.

In the second selection step, the variation values are obtained, for each group in the small area, by performing weighting in such a way that the variation values become larger as a quantity of pixels in the group becomes larger, and said selecting is performed based on the variation values thus obtained.

In the reference value calculation step and the second reference value calculation step, if there is no specific value of a post-conversion color parameter whose corresponding quantity of pixels is "0" in a relationship, covering the minimum value through to the maximum value of the post-conversion color parameter to be targeted, between the values of the post-conversion color parameter to be targeted and quantities of pixels in the group to be targeted, a value closest to a center value between the maximum and minimum values is obtained as the reference value.

The second selection step, the second reference value calculation step, and the second grouping step are repeated for the small area until a quantity of the groups in the small area becomes a predetermined quantity.

If all of the variation values of the individual post-conversion color parameters in each group in the small area are equal to or smaller than a predetermined threshold value, the representative color calculation step is performed by skipping the grouping that is performed in the grouping step and the second grouping step even if the quantity of the groups in the small area is smaller than the predetermined quantity.

In the reference value calculation step, if there are a plurality of values of a post-conversion color parameter whose corresponding quantity of pixels is "0" in a relationship between the values of the post-conversion color parameter to be targeted and quantities of pixels in the group, a value closest to a center value between the maximum and minimum values of the post-conversion color parameter in the group is obtained as the reference value.

A center value of the values of the post-conversion color parameter to be targeted in the group is obtained as the reference value.

An average value of the values of the post-conversion color parameter to be targeted in the group is obtained as the reference value.

According to the present invention, degradation in the image can be reduced in such image processing in which the amount of data can be reduced by reducing the number of colors used in the image data that is expressed by C, M, Y, and K colors.

BRIEF DESCRIPTION OF DRAWINGS

FIG. 15 depicts values of individual color parameters in the block illustrated in FIG. 14.

BEST MODE FOR CARRYING OUT THE INVENTION

Figure 1:
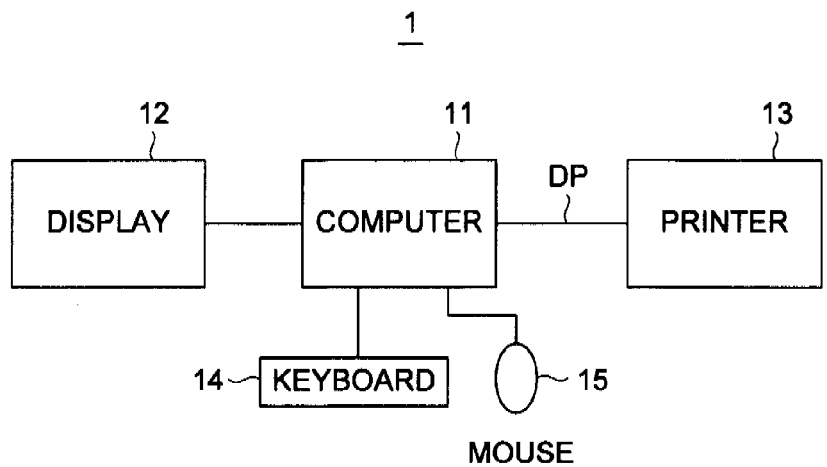
FIG. 1 is a diagram illustrating an overall configuration of a print system employing the image data compression method according to the present invention.

In FIG. 1, a print system 1 is a system for printing an image by means of a printer 13 based on a command inputted to a computer 11 by a user. The print system 1 is configured of the computer 11, a display 12, a keyboard 14, a mouse 15, the printer 13, and so on. The computer 11 and the printer 13 are connected to each other through a communication cable compatible with USE or RS-232C standard. It is also possible to use a communication network such as LAN (Local Area Network) for the connection.

The computer 11 stores data such as of images or documents externally fed in or generated therein in a storage medium such as a hard disk of its own. When a user gives a command for print execution through the keyboard 14, the mouse 15, or the like, the computer 11 converts the data to be printed and designated by the command into data in a predetermined format for printing, such as a format described by a page description language, and transmits the converted data to the printer 13. Hereinafter, the data to be printed and transmitted from the computer 11 to the printer 13 may be referred to as "print target data DP".

The printer 13 compresses the print target data DP transmitted from the computer 11 by a compression method using the BTC according to this embodiment and stores the resultant data in a storage medium such as an internal memory. When the data for a page is stored, the printer 13 starts printing the page.

Here, a personal computer, a work station, or the like is used as the computer 11. A color-capable laser printer or an MFP (Multi-Function Peripheral) is used as the printer 13.

Figure 2:
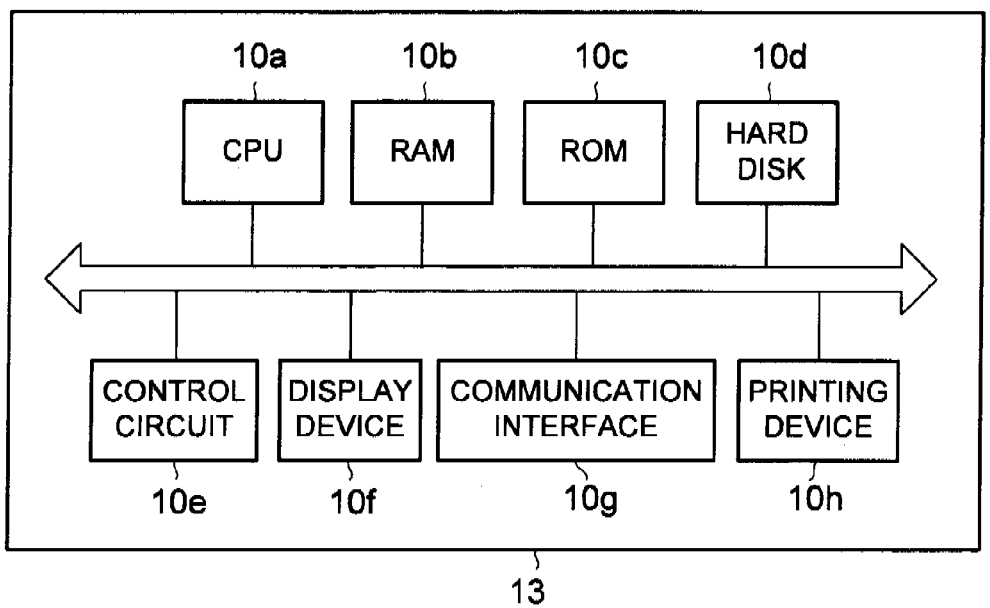
FIG. 2 is a diagram illustrating an example of the hardware configuration of a printer.

As illustrated in FIG. 2, the printer 13 is configured of a CPU 10a, a RAM 10b, a ROM 10c, a hard disk 10d, a control circuit 10e, a display device 10f, a communication interface 10g, a printing device 10h, and so on.

The CPU 10a performs entire control of the printer 13. Various programs and data are installed in the hard disk 10d and read out therefrom as required so that the read-out program is executed by the CPU 10a. It is also possible to store a part or whole of programs and data in the ROM 10c.

The printing device 10h is a device that print images on paper based on the data to be printed that is transmitted from the computer 11 or the like.

The communication interface 10g is an interface, which is compatible with RS-232C, USB, or the like, for communicating with other devices. A NIC (Network Interface Card), a modem, or the like may also be used.

The display device 10f displays thereon a message to a user who operates the printer 13 or details of settings given by the user.

The control circuit 10e is a circuit that controls such devices as the hard disk 10d, the printing device 10h, the communication interface 10g, the display device 10f, and so on.

Figure 3:
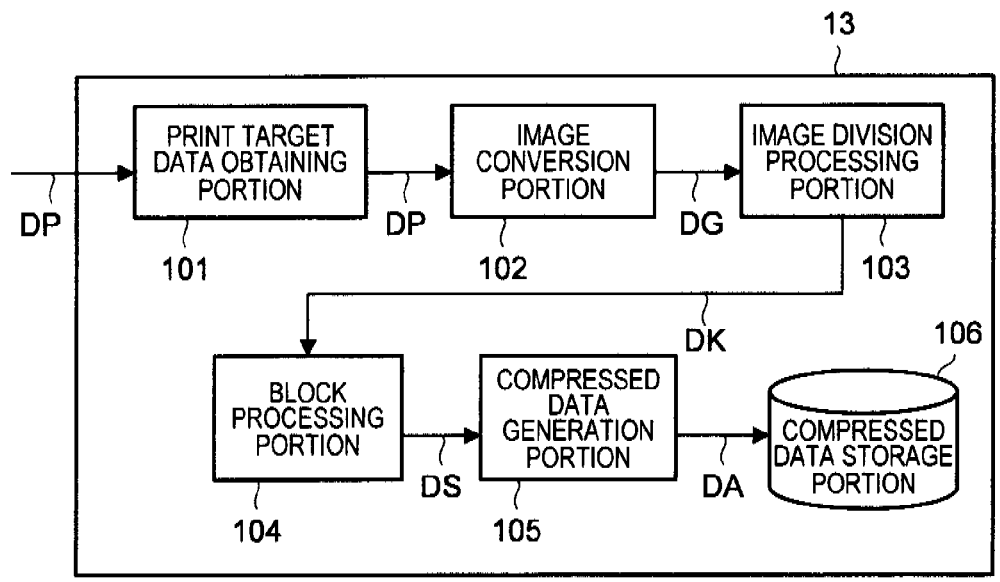
FIG. 3 is a diagram illustrating an example of the functional configuration of the printer.

As illustrated in FIG. 3, the printer 13 is configured of a print target data obtaining portion 101, an image conversion portion 102, an image division processing portion 103, a block processing portion 104, a compressed data generation portion 105, a compressed data storage portion 106, and so on.

The hard disk 10d stores programs and data for implementing functions of these individual portions. These programs and data are loaded into the RAM 10b as necessary, whereupon the programs are executed by the CPU 10a. The whole or a part of the programs or data may be stored in the ROM 10c. Alternatively, the whole or a part of the functions of the individual portions illustrated in FIG. 3 may be implemented by hardware such as the control circuit 10e or the like.

The print target data obtaining portion 101 obtains the print target data DP transmitted from the computer 11 or the like. The image conversion portion 102 converts (expands) the print target data DP thus obtained into image data DG in a format such as bitmap, or is capable of converting the print target data DP into image data expressed by individual primary colors such as R (Red), G (Green), and B (Blue) or image data expressed by individual primary colors such as C (Cyan), M (Magenta), Y (Yellow), and K (Black). In this embodiment, image data expressed by individual primary colors each having 256 gray levels in 8 bits is used.

Hereinafter, image data may be sometimes described as "image" by omitting "data" therefrom. Also, images expressed by RGB colors and CMYK colors may be referred to as an "RGB image" and a "CMYK image", respectively.

Figure 4:
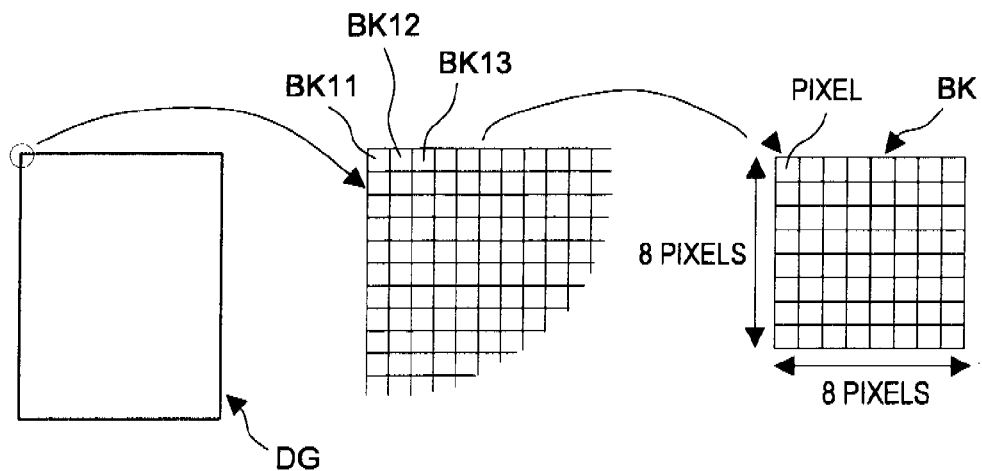
FIG. 4 is a diagram depicting a divided block.

As illustrated in FIG. 4, the image division processing portion 103 performs processing of dividing the image data DG into blocks BK each of which is a small region having a predetermined size, i.e., into blocks BK each having a size of 8 by 8 matrix of pixels in this embodiment. Hereinafter, the blocks BK are sometimes referred to as "block BK1", "block BK2", and so on with a serial number added thereto to distinguish one from another. Likewise, other symbols may be distinguished from one from another by adding a serial number thereto and, sometimes, collectively referred to by omitting the serial number.

In this process, the image division processing portion 103 generates block data DK for each of the blocks BK. The block data DK includes coordinates and a size of the block BK, density values of individual pixels included in the block, and the like. As the coordinates of the block BK, for example, coordinates of a pixel located at the upper left corner of the block BK are used when the upper left corner of the image data DG is assumed as an origin. The density values include individual density values for individual color components such as RGB colors which represent a color of the pixel.

Hereinafter in this specification, the terms "R", "G", and "B" may be sometimes used as color parameters indicating density values of R, G, and B color components, respectively. Likewise, alphabetic characters respectively corresponding to other color components such as C, M, Y, K, L (lightness), R_G (degree of red-green), B (degree of blue) may be sometimes used as color parameters.

The block processing portion 104 performs a process using the BTC according to this embodiment on each block BK and outputs processed block data DS.

In this embodiment, the density of each pixel in the block BK is compensated in accordance with a predetermined rule, and individual pixels are divided into groups based on the compensated values. The grouping is repeated unless a predetermined condition such as the number of groups is satisfied.

Then, a representative color of each group is obtained. The representative color is then dealt with as an approximated color for the pixels belonging to the group so that the number of colors used in the block and the amount of data are reduced.

Specific processing steps will be described later for separated cases of an RGB image and a CMYK image.

The compressed data generation portion 105 generates compressed data DA of image data DG by using processed block data DS of each block BK. The compressed data storage portion 106 stores the compressed data DA thus generated. When the compressed data DA for a page is stored, printing of the page starts.

Hereinafter, detailed descriptions will be given of the processing performed by the block processing portion 104 in the cases of a reference example and an embodiment example.

REFERENCE EXAMPLE

In this example, the process performed by the block processing portion 104 will be described in the case where print target data DP is converted into image data DG expressed by RGB colors in the image conversion portion 102.

Figure 5:
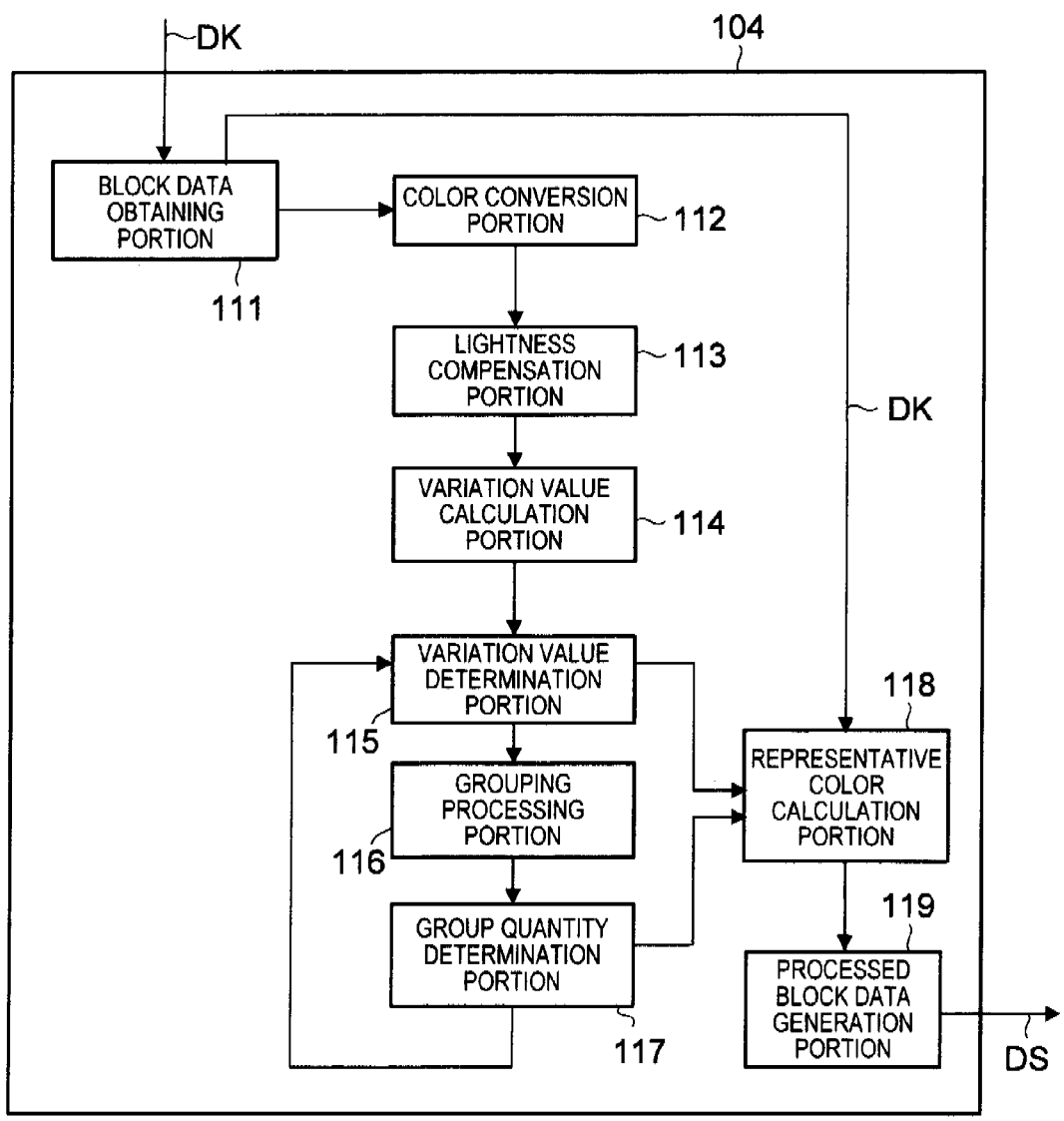
FIG. 5 is a diagram illustrating an example of a configuration of a block processing portion.

As illustrated in FIG. 5, the block processing portion 104 is configured of a block data obtaining portion 111, a color conversion portion 112, a lightness compensation portion 113, a variation value calculation portion 114, a variation value determination portion 115, a grouping processing portion 116, a group quantity determination portion 117, a representative color calculation portion 118, a processed block data generation portion 119, and so on.

The block data obtaining portion 111 obtains block data DK from the image division processing portion 103. Hereinafter, a description is based on the assumption that a process is performed on a block BK1 of the block data DK thus obtained.

The color conversion portion 112 obtains values for a color space of L, R_G, and B from values of individual color parameters (density values) for RGB colors of individual pixels in the block BK1 that is indicated in the block data DK so that appropriate weighting is performed when the values of the color parameters are converted and compensated in the subsequent process. Specifically, this is achieved by performing the following step for each pixel. Values of the individual color parameters for RGB colors for each pixel are substituted into the right-hand side of the equations to thereby obtain values of the individual color parameters for L, R_G, and B (blue signal) on the left-hand side.

$$L=(R\times 3+G\times 6)\div 8$$

$$R\_G=(R\times 6+(255-G)\times 3)\div 8$$

$$B=B \qquad (1)$$

The lightness compensation portion 113 performs compensation for emphasizing the lightness of the pixels in the block BK1. Specifically, this is achieved by obtaining "L2" on the left-hand side by substituting the value of lightness L, which is obtained by the color conversion portion 112, into the right-hand side of Equation (2). Here, "L2" is a color parameter indicating a lightness value after compensation.

$$L2=L+((L+(L\text{max}-HR))\times(L-(L\text{max}-HR)))\div HR \qquad (2)$$

Here, L2 represents lightness after compensation; L represents lightness before compensation; Lmax represents a constant ("255×(3+6)÷8" in this example); and HR (Highlight Range) represents a constant ("30" in this example). In this example, the above-mentioned compensation is performed only if the following condition is satisfied.

$$L > L\text{max}-HR \qquad (3)$$

With this arrangement, the lightness of each pixel is corrected to become further higher as the original lightness is higher. It has been empirically known that a change in color in a lighter portion of an image is more visible than a change in color in a darker portion. The above-mentioned compensation is to respond to such a nature.

Such color parameters, i.e., values of L2, R_G, and B, which are obtained as described above, are stored in a predetermined storage area for each pixel, for example, in association with the coordinates of the pixel in the block BK1.

The variation value calculation portion 114 obtains a variation value which indicates a state of variation or a degree of variation of each color parameter in the block BK1. Specifically, this is obtained according to the following Equations (4) assuming individual pixels in the block BK1 as a single group.

$$R1=(RG\text{max}-RG\text{min})\times(N+3)\times 2$$

$$R2=(L\text{max}-L\text{min})\times(N+3)\times 3$$

$$R3=(B\text{max}-B\text{min})\times(N+3)\times 1 \qquad (4)$$

Here, R1 represents a variation value of R_G in a group; R2 represents a variation value of L2 in the group; R3 represents a variation value of B in the group; RGmax represents a maximum value of R_G in the group; RGmin represents a minimum value of R_G in the group; Lmax represents a maximum value of L2 in the group; Lmin represents a minimum value of L2 in the group; Bmax represents a maximum value of B in the group; Bmin represents a minimum value of B in the group; and N represents a number of pixels in the group.

As shown in Equations (4), a variation value of each color parameter for L2, R_G, and B in the block BK1, an amount of change, i.e., a difference between maximum and minimum values, is obtained in this example. During that process, weighting (adding weight) is performed such that the variation value becomes larger as the number of pixels in the block BK1 increases. It is also possible to obtain a variance value of each color parameter in the block BK instead of the variation value.

The variation value determination portion 115 determines whether or not the maximum value among the variation values of each color parameter is equal to or smaller than a predetermined threshold value, i.e., whether or not the condition expressed by Equation (5) as stated below is satisfied. If the maximum value is equal to or smaller than the predetermined threshold value, then a process by the representative color calculation portion 118, which will be described later, is performed.

The following equation determines whether a value obtained by removing "N+3", which is a weighting factor with respect to the number of pixels in Equation (4), is "6" or smaller. It also corresponds to "6" which is a variation width of R_G.

$$R\text{max} > 6 \times (N+3) \tag{5}$$

Here, Rmax represents the maximum value of the obtained variation values, and N represents the number of pixels in the group.

The grouping processing portion 116 performs a process of grouping the individual pixels in the block BK1 into two groups if the variation value is larger than the predetermined threshold value. The following is the detail of the process.

First, a color having a maximum variation value is selected as a target parameter (target color) among color parameters of L2, R_G, and B. Then, a minimum value and a maximum value of the target parameter in the block BK1 are obtained. A value between the minimum value and the maximum value is equally divided into 16. Hereinafter, each individual segment resulted from dividing the value into 16 may be referred to as "sector". Further, the number of pixels whose target parameter values fall within a sector in the block BK1 is counted for each sector, and a histogram indicating the relationship between the sector and the number of pixels is generated.

Figure 6:
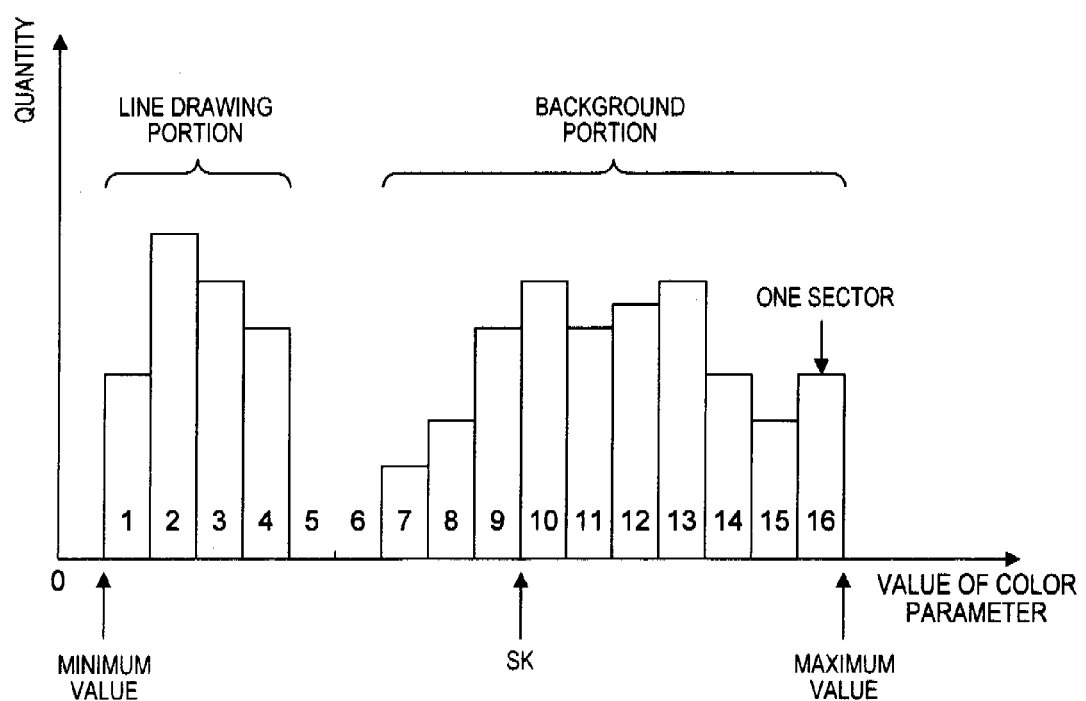
FIG. 6 is a diagram illustrating a histogram showing a relationship between values of parameter to be targeted and quantities of pixels in a block.
Figure 16:
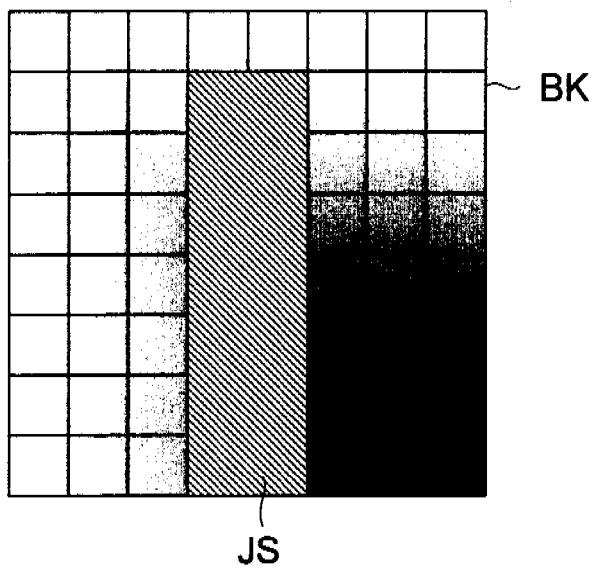
FIG. 16 is a diagram illustrating an example of a block including images of a line drawing portion and a background portion.
Figure 16:
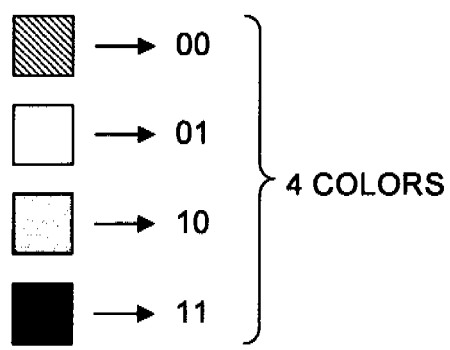
Figure 16:
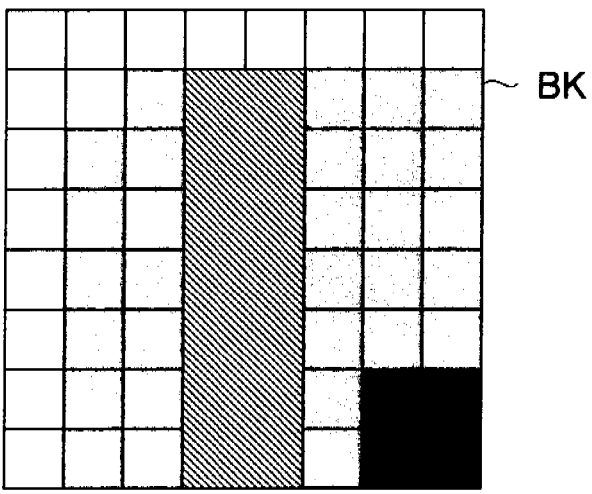
Figure 17:
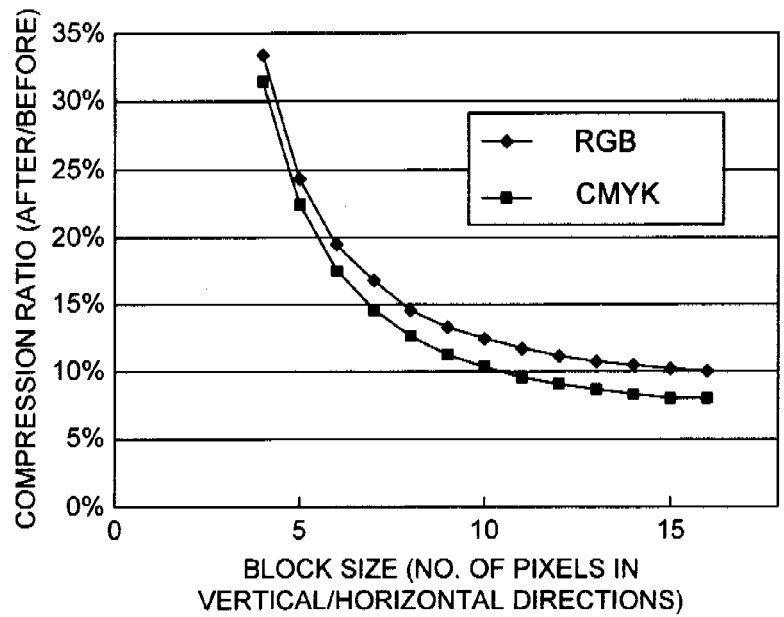
FIG. 17 is a graph indicating a relationship between compression ratios and block sizes.
Figure 18:
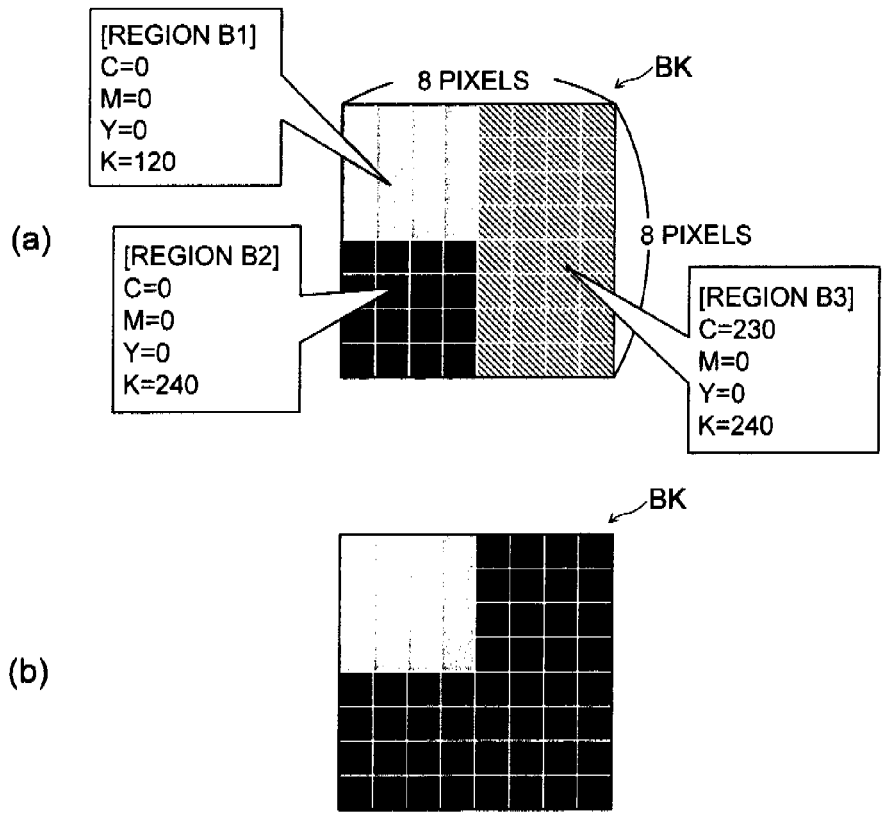
FIG. 18 is a diagram illustrating an example of a block including an image having three regions.
Figures 19, 20:
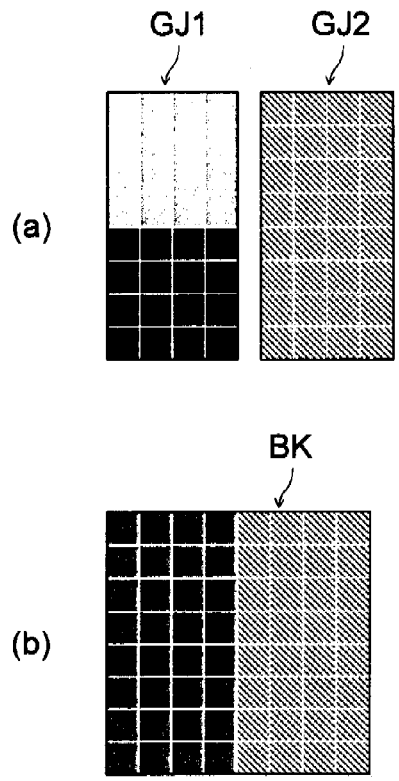
FIG. 19 is a diagram depicting a process of grouping by a conventional process using BTC.
FIG. 20 is a diagram depicting average values of densities for individual color components in each group in the block.

If the block BK1 is a block BK as illustrated in FIG. 16(a), a histogram as illustrated in FIG. 6 is obtained. It should be noted, however, that the block BK illustrated in FIG. 16(a) includes an image representing a line drawing portion JS and a background portion thereof.

In this histogram, a sector group on the left shows sectors for the pixels of the line drawing portion JS, and a sector group on the right shows sectors for the pixels of the background portion. In this histogram, it is assumed that the larger the value of the color parameter becomes, the lighter (pale) it appears.

In the histogram in FIG. 6, starting from a sector in the vicinity of the center, the sectors are searched for a sector having a number of pixels of "0". In other words, discontinuity where the histogram discontinues is searched for. During such a process, the sectors at both ends are excluded from the sectors to be searched for. In the example in FIG. 6, the sectors are numbered from "1" through "16" sequentially from the left. In this case, the 6th. sector is detected in the search.

A value based on the detected sector (for example, the maximum value in the sector) is assumed as a threshold value. The pixels are then divided into a group of pixels whose target parameter values are larger than the threshold value and a group of pixels whose target parameter values are smaller than the threshold value. As a specific process for grouping, an identification number of a group to which a pixel belongs is assigned to each pixel, and the coordinates of the pixel and the identification number are stored in association with each other.

If there is no sector whose number of pixels is "0", a value intermediate between the maximum and minimum variation values or a value based on a sector corresponding to the value closest to the intermediate value is used as the threshold value for grouping.

The group quantity determination portion 117 determines whether or not the number of groups in the block BK1 reaches a predetermined quantity (four in this example). Hereinafter, the quantity may be referred to as "target quantity".

If the quantity of groups does not reach the "target quantity", a process for grouping is repeated by the variation value calculation portion 114, the variation value determination portion 115, the grouping processing portion 116, and the group quantity determination portion 117. Such a process is performed in a manner described below.

First, the variation value calculation portion 114 obtains, for each group in the block BK1, the variation value of each color parameter in the group by using Equation (4) which has been described. If there are two groups, six variation values can be obtained in this example. The variation value determination portion 115 determines whether or not the maximum value of the variation values thus obtained is smaller than a predetermined threshold value, i.e., whether or not all variation values thus obtained are smaller than the predetermined threshold value. If it is smaller, the processing bypasses the grouping and skipped to the process by the representative color calculation portion 118. If any of the variation values is larger than the threshold value, a process for the grouping is performed.

When the grouping is performed, the grouping processing portion 116 selects a color parameter showing a maximum variation value among the six obtained variation values as a target parameter and also selects a group relating to such a variation value as a target group. The maximum and minimum values of the target parameter in the target group are obtained, and a histogram is generated in the same manner as indicated in FIG. 6. Then, discontinuity of the histogram is searched for. Based on the result, a threshold value used for grouping is obtained. Next, based on the threshold value, individual pixels belonging to the target group are divided into two groups.

Thereafter, when the group quantity determination portion 117 determines that the quantity of groups reaches the target quantity, the grouping process is completed and a process by the representative color calculation portion 118 is started. If the quantity of groups does not reach the target quantity, the process for grouping is repeated by the variation value calculation portion 114, the variation value determination portion 115, the grouping processing portion 116, and the group quantity determination portion 117.

The representative color calculation portion 118 obtains, for each group in the block BK1, a representative color of the group. This is specifically obtained in a manner described below.

Each value for R, G, and B of each pixel is obtained for the group for which the representative color will be obtained. The value of such a color parameter is indicated in the block data DK obtained by the block data obtaining portion 111. An average value in the group is obtained for each of R, G, and B. A color expressed by each average value for R, G, and B is determined as a representative color of the group. In this example, this means obtaining a representative color of 24 bits consisting of R, G, and B each of which expressed by 8 bits. The representative color thus obtained is stored in a predetermined storage area in association with an identification number of the group for which the representative color is obtained.

The processed data block data generation portion 119 generates processed block data DS which is data expressing the image in the block BK1 by the obtained representative colors. The processed block data DS indicates representative colors of respective groups, identification numbers of respective groups, corresponding relationships between the groups and the representative colors, and corresponding relationships between individual pixels and identification numbers of the groups to which the pixels belong.

Here, with reference to FIG. 7, a description will be given of dividing the pixels into groups when viewed from the perspective of the color space of L, R_G, and B.

Figure 7:
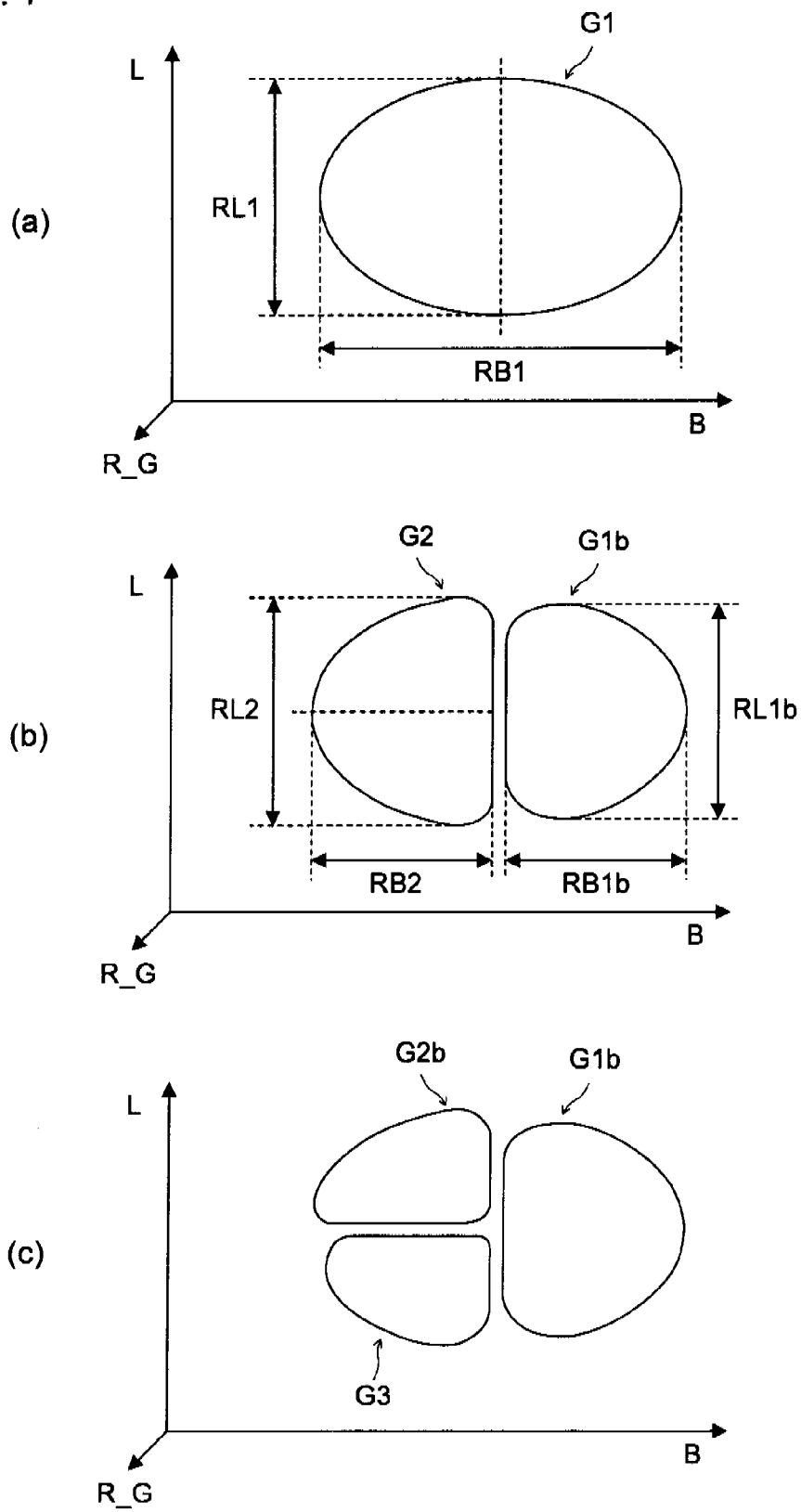
FIG. 7 is a diagram illustrating a grouping process performed on pixels when viewed in the color space of L, R_G, and B.

FIG. 7 illustrates a distribution range G1 formed in the color space of L, R_G, and B by plotting dots based on the respective color parameter values of L2, R_G, and G for individual pixels included in the block BK. Hereinafter, the distribution range G1 may sometimes be referred to as "group G1". In FIG. 7, it is assumed that the distribution range is projected on a plane passing along an L axis and a B axis and thereby is two-dimensional. This means that the R_G direction is not taken into account. It is also assumed that the distribution range G1 is longer along the B axis.

A two-bit identification number is given to the group G1 prior to grouping. Here, the identification number thus assigned is "00".

In FIG. 7, ranges RL1 and RB1 represent the lengths of the distribution range G1 in the directions of L axis and B axis, respectively. Here, a description will be given by assuming that the ranges RL1 and RB1 are variation values of individual color parameters of L and B in the block BK, respectively.

In this example, since the range RB1 is longer than the other, color B is taken as the target parameter. If the range RB1, which indicates the variation values of the target parameter, is larger than a predetermined threshold value, the group G1 is divided at a center value of the range RB1, whereby a new group G2 is created as illustrated in FIG. 7(*b*). Here, "01" is assigned as an identification number of the group G2. Hereinafter, the remaining portion of the group G1 is referred to as "group G1*b*".

After the division, lengths in respective directions (ranges RL2, RB2, RL1*b*, and RB1*b*) are obtained for each of the groups G1*b* and G2. It is assumed that the range RL2 is the longest.

In this case, if the range RL2 is larger than a predetermined value, further grouping is performed. In such a case, the group RL2 is divided based on center value of the range RL2 to form a new group G3 as illustrated in FIG. 7(*c*). Here, "10" is assigned as an identification number of group G3. Hereinafter, the remaining portion of the group G2 is referred to as "group G2*b*".

Likewise, in FIG. 7(*c*), lengths in respective directions are obtained for each of the groups G1*b*, G2*b*, and G3. If the maximum value among such lengths is equal to or smaller than a predetermined value, grouping is performed. This process is repeated unless the quantity of groups becomes 4.

Figure 8:
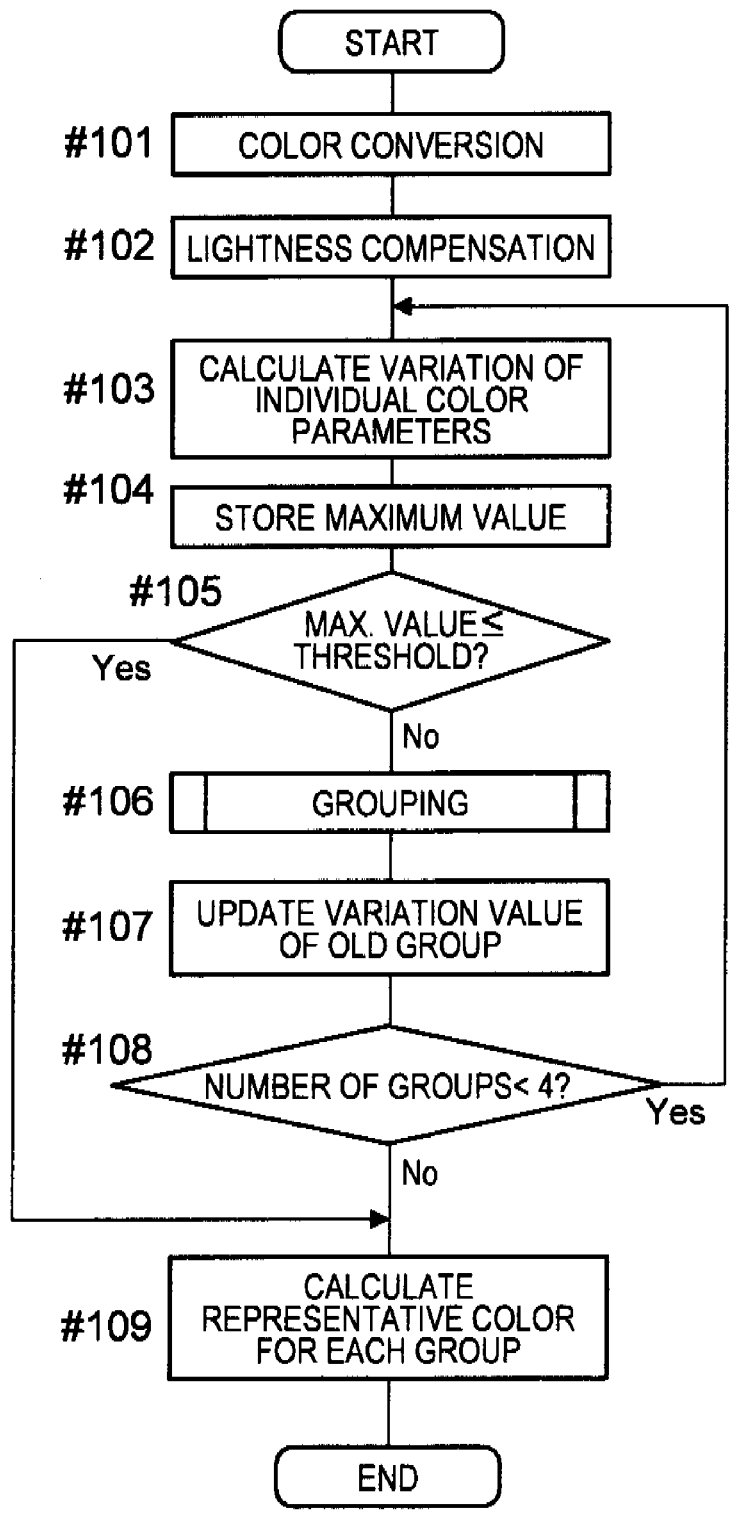
FIG. 8 is a flowchart illustrating a flow of process of individual parts in a block processing portion.

Referring to FIG. 8, first, the block data DK is obtained from the image division processing portion 103. A value expressed in the color space of RGB of each pixel included in the block BK indicated in the block data DK is converted into a value expressed in the color space of L, R_G, and B in which a change in value is visually proportional to a change in color (#101). Then, a value of color parameter (L) related to lightness is compensated to become further larger as the original value thereof is larger (#102).

The variation value, which corresponds to a range of change in the block BK, is obtained for each color parameter value resulted from the process in the steps #101 and #102

A maximum value of the obtained variation values is stored, and a color parameter identified as the maximum value is set as a target parameter (#104).

If the maximum value is equal to or smaller than a predetermined threshold value (Yes in #105), a representative value for the block BK is obtained (#109). If the maximum value is larger than the threshold value (No in #105), the whole of the block BK is assumed as a target group and a grouping process for dividing pixels belonging to the target group is performed (#106).

Figure 9:
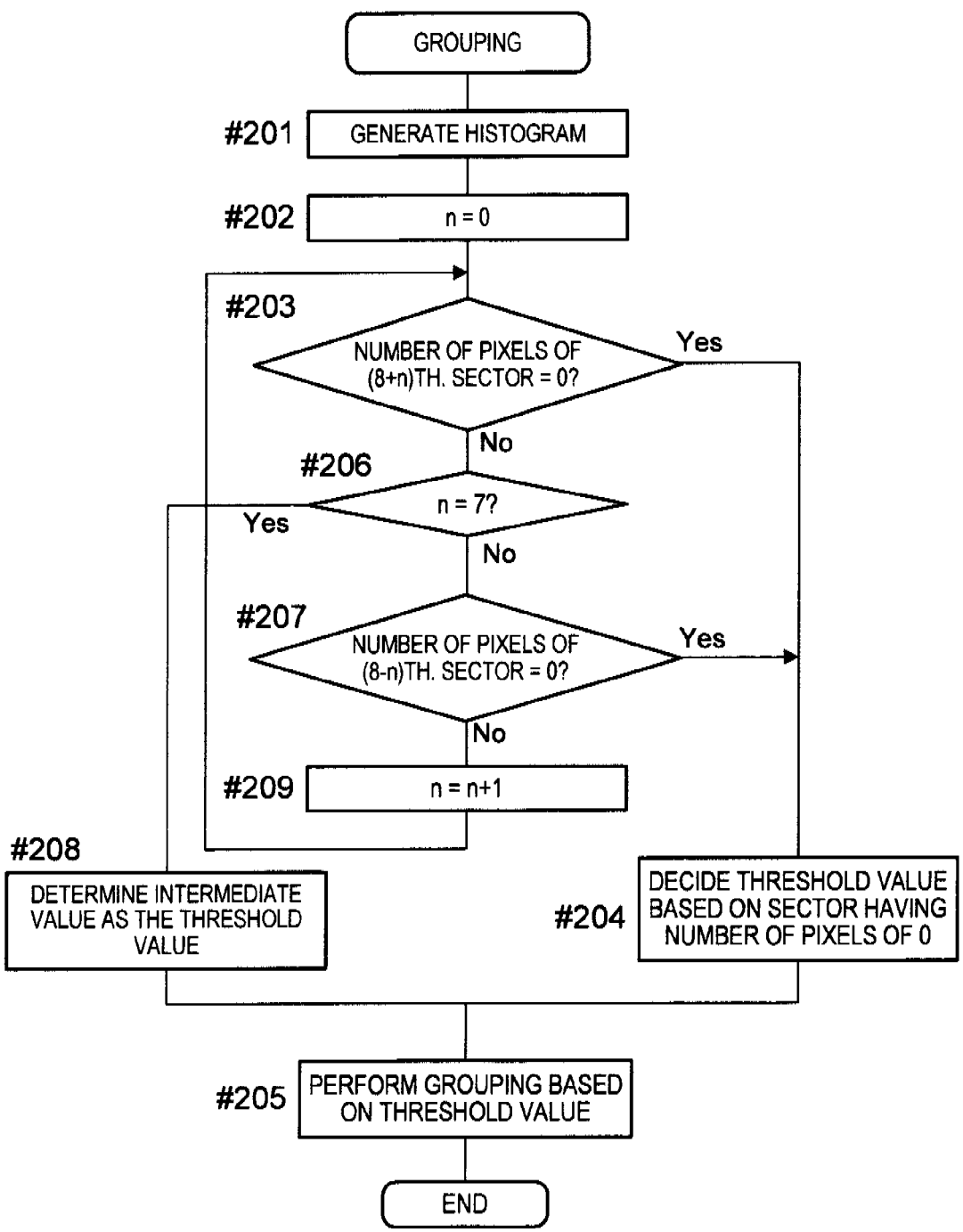
FIG. 9 is a flowchart illustrating a flow of a grouping process.

Referring to the grouping process illustrated in FIG. 9, a histogram is generated to show a relationship between a value of the target parameter and the number of pixels in the target group (#201). Here, a description will be given by assuming that such a histogram illustrated in FIG. 6 is generated.

First, a value of "n" serving as a counter for counting a sector number in the histogram is initialized to "0" (#202). The number of pixels of the 8th. sector having a sector number of "8+n" is checked. If the number of pixels is "0" (Yes in #203), a maximum value of the sector is determined as a threshold value for a grouping process (#204). In this case, another value such as a minimum value or a center value may be taken as the threshold value. Then, the pixels in the target group are divided into two groups based on the obtained threshold value (#205).

In step #203, since the number of pixels in the 8th. sector in the example illustrated in FIG. 6 is not "0", the process moves to step #206. In step #206, a value of "n" is checked. If the value is "7", then an intermediate value between maximum and minimum values of variation in the target group for the target parameter is determined as the threshold value for grouping (#208). Then, the grouping is performed based on the threshold value thus obtained (#205). Since the value of "n" is "0" in this example, the process advances to step #207 (No in #206).

In step #207, the number of pixels for a sector having a sector number of "8−n" is checked. If the number of pixels is "0" (Yes in #207), the process moves to #204. Since the number of pixels is not "0", the value of "n" is incremented by 1 (#209). Then, the process moves back to step #203, and the same process is repeated thereafter. By the repeated process, a sector having the number of pixels "0" is searched for, starting from a center sector alternately toward each end step by step.

It is assumed that the value of "n" is incremented to "2" at certain timing during the process is repeated. Then, the process shifts from step #207 to #204. Since the number of pixels for the 6th. sector, which is a sector having a sector number of "8−n", is "0", the threshold value is determined based on a value for that sector (#204) and grouping is performed (#205).

If a sector whose number of pixels is "0" is not found, the process from step #203 and onward is repeated. When "n"

becomes "7", the process branches out from step #206 to step #208 (Yes in #206). Specifically, when the search through to the 15th. sector is completed, the process of search ends, and the intermediate value between maximum and minimum values of the target parameter in the group is determined as the threshold value (#208).

Through the process described above, all the sectors excluding the sectors at both ends, i.e., 1st. and 16th. sectors, are subjected to the search, which starts from the 8th. in the center, 9th., 7th., 10th., and so on toward individual sectors at both ends. By this process, a sector closest to a center sector number among points of discontinuity where the number of pixels is "0" is detected.

Hereinafter, one of the groups, which is newly created in the process of grouping is named a new group and the other group of pixels is named an old group.

Referring back to FIG. 8, a variation value for each color parameter is obtained in an old group (#107). In that process, weighting is performed in such a way that the variation value becomes larger as the number of pixels in the group increases. Weighting is performed also in such a way that the variation value becomes larger for such a color parameter whose visual lightness further increases as the value increases. When the number of groups reaches four (No in #108), a representative value for each group is calculated (#109).

If the number of groups is smaller than four (Yes in #108), the process in step #103 and onward is repeated. In that case, a variation value of each color parameter for the new group is obtained. In that process, weighting is performed in such a way that the value becomes larger as the number of pixels in the new group increases. Weighting is performed also in such a way that the variation value becomes larger for such a color parameter whose visual lightness further increases as the value increases.

The maximum value among the obtained variation values is stored (#104). Then, the color parameter and the group corresponding to the maximum value are subjected to a grouping process as a target parameter and a target group, respectively (#106). In a similar manner, the grouping is repeated by following the processes in step #103 and onward if the number of groups remains smaller than 4 or the maximum value among the obtained variation values remains larger than a predetermined threshold value. Thereafter, a representative value is calculated for each group defined in the block BK (#109). Based on this result, the processed block data DS is generated and stored.

All the blocks BK that are obtained by division undergo the above-mentioned process to generate the compressed data of the image data DG.

Incidentally, according to the conventional method shown in JP2001-338284A, an average value of the target parameter in the block BK is used as a threshold value for performing the grouping. Accordingly, if an image in the block BK is such an image illustrated in FIG. 16(a), the threshold value for grouping tends to be closer to the density value of the pixels in the background portion having a larger number of pixels rather than the density value of the pixels in the line drawing portion JS having a smaller number of pixels. For this reason, the threshold value sometimes becomes a value by which the pixels in the background portion are divided into two, for example, as a value SK depicted in FIG. 6. As a result of this, a part of the background portion is grouped into the same group as for the pixels of the line drawing portion JS and is converted into the same approximated color as for the line drawing portion, leading to a lower grade of image quality.

According to this example, however, since the threshold value is determined based on the sector having the number of pixels of "0" in the histogram, it is possible to properly divide the pixels into a group of pixels of the line drawing portion and a group of pixels of the background portion, whereby such a lower grade of image quality can be prevented.

Figure 10:
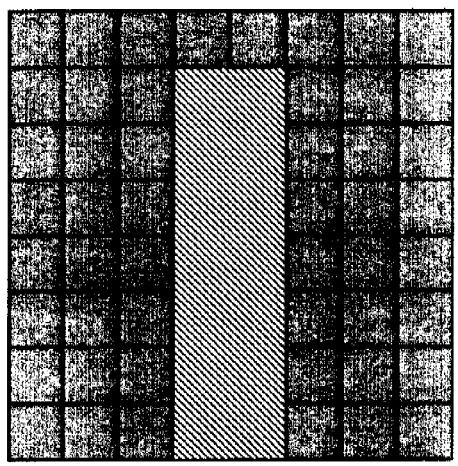
FIG. 10 is a diagram illustrating an image of a block after a process using BTC of the reference example is applied.
Figure 10:
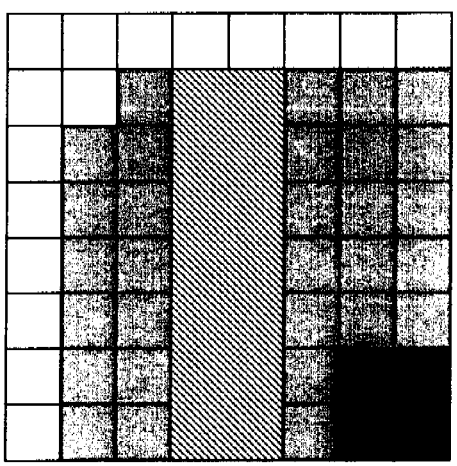

For example, when the block BK illustrated in FIG. 16(a) undergoes the method according to this example and is expressed by two representative colors, i.e., divided into two groups, the result will be, for example, the one illustrated in FIG. 10(a). When four representative colors are used, the result will be as illustrated in FIG. 10(b).

When the block is expressed by two representative colors, the data can be compressed to about 7% of the original size because the amount of data of the image (24-bit full color image) in the original block BK is 1536 bits resulted from "24 bits×64 pixels", and the amount of data of the image after compression becomes 112 bits resulted from "1 bit×64 pixels+24 bits×2 colors". When the block is expressed by four representative colors, the data can be compressed to about 15% of the original size because the amount of data of the image after compression becomes 224 bits resulted from "2 bits×64 pixels+24 bits×4 colors".

Furthermore, according to this example, when the number of colors used in the block BK is four or less, there is no degradation of image quality caused by a change in color because the pixels are properly grouped according to the color thereof. When four or more colors are used, pixels having closer colors are grouped together into the same group. This makes it possible to properly convert colors of pixels into proper colors causing less change in color.

Even if the number of groups remains less than a predetermined quantity, no more grouping is preformed if each of the variation values that are obtained for individual groups in the block BK is smaller than a predetermined threshold value. With this arrangement, it is possible to reduce the number of grouping processes and thereby increase the processing efficiency without largely lowering the image quality.

EMBODIMENT EXAMPLE

In this embodiment example, a description will be given of a process performed by the block processing portion 104 (hereinafter, referred to as "block processing portion 104B" in this embodiment example) when the print target data DP is converted into image data DG in CMYK colors in the image conversion portion 102.

Figure 11:
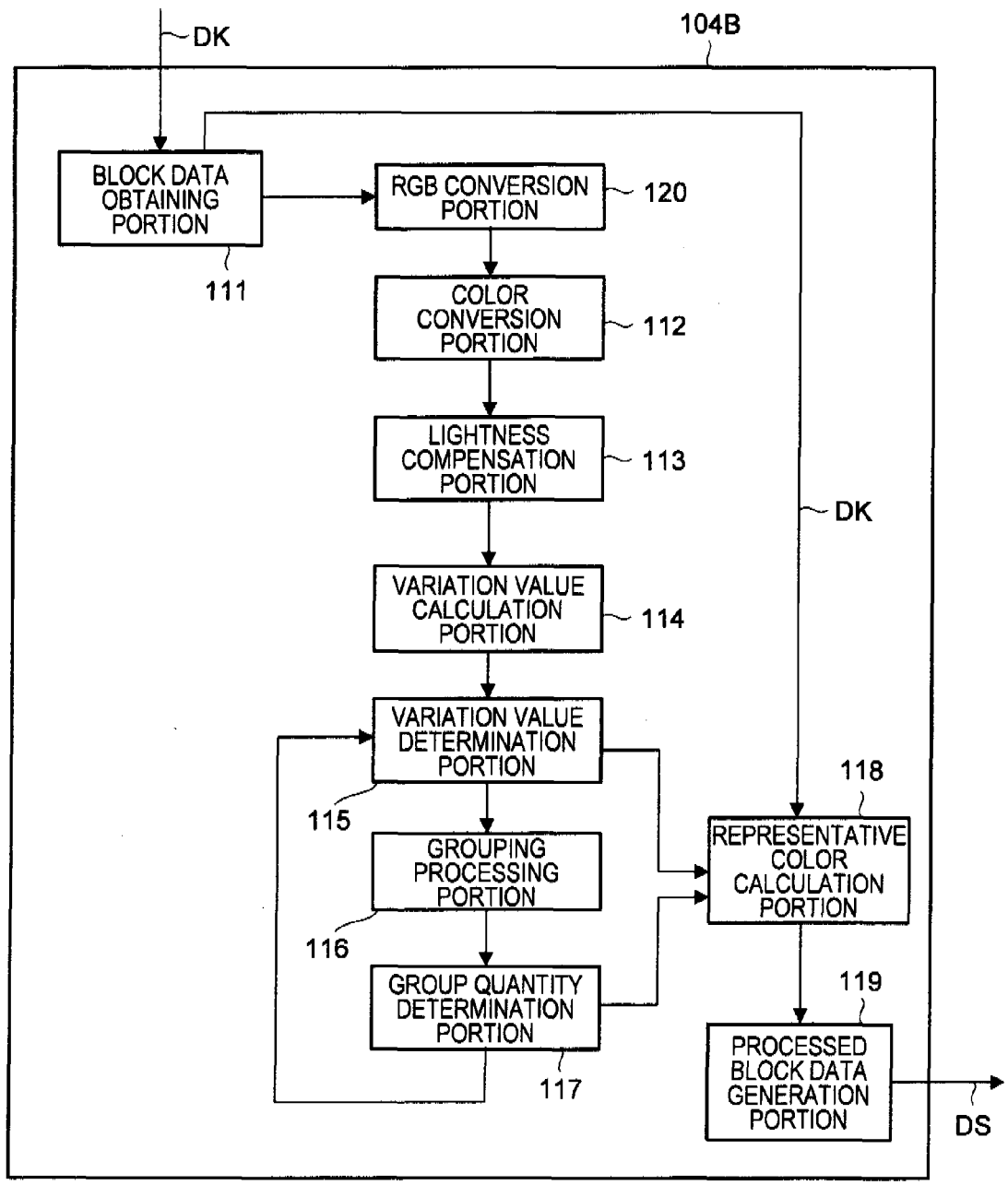
FIG. 11 is a diagram illustrating an example of a configuration of a block processing portion according to the embodiment.

The block processing portion 104B according to this embodiment example is configured of the block processing portion 104 of the reference example illustrated in FIG. 5 and an addition of "RGB conversion portion", as illustrated in FIG. 11.

In FIG. 11, a block data obtaining portion 111 obtains block data DK that includes values (density values) of individual color parameters (color components) of C, M, Y, K colors for each pixel in the block BK1.

An RGB conversion portion 120 obtains values of individual color parameters for R, G, and B colors from values of individual color parameters for each pixel in the block BK1. Here, Equation (6) shown below is used in consideration of characteristics of the inks and toners. To be specific, values of R, G, and B are obtained by substituting values of C, M, Y, and K into the right-hand side of Equation (6).

$$R = (255-C) \times (255+20-K) \div 256$$

$$G = (255-M) \times (255+20-K) \div 256$$

$$B = (255-Y) \times (255+20-K) \div 256 \qquad (6)$$

The constant "20" in Equation (6) is a coefficient which is decided by considering that, even if the value of K is 100% ("256" when it is expressed in 256 gray levels), the color tone changes if the values of C, M, and Y change. By this Equation (6), such conversion is performed to make the amounts of changes in R, G, and B smaller as the value for K is larger.

A color conversion portion 112 obtains values of individual color parameters for L, R_G, and B from the values of individual color parameters for R, G, and B thus obtained. Here, the following Equation (7) is used instead of previously used Equation (1). However, it is also possible to use Equation (1) as is.

$$L = (R+G) \div 2$$

$$R\_G = (R+255+30-G) \div 2$$

$$B = B \quad (7)$$

A lightness compensation portion 113 performs compensation to emphasize the lightness by using previously used Equation (2). However, in this embodiment example that deals with a CMYK image, "Lmax" in Equation (2) is replaced with "285×(255+30)" for calculation.

In the case of a CMYK image, due to a difference between the actual color tone and the definition used here, there is sometimes a case where the three-dimensional amounts for L, R_G, and B do not change despite the fact that the actual color is changed. To cope with also such a case, the grouping is performed in the four-dimensional space including K so as to perform the grouping appropriately. Since the R, G, and B colors already include a component of K, a compensation is performed, as shown in Equation (8) below, so as to lower the weight of the value for K. This is carried out by substituting the value for K into the right-hand side of Equation (8) to obtain K2.

$$K2 = K \div 4 \quad (8)$$

A variation value calculation portion 114 obtains a variation value indicating a degree of variation of each color parameter in the block BK1. In this embodiment example, the following Equation (9) is used instead of Equation (4). In this case, R_G is weighted greater than for B, and L is weighted further greater than for R_G. This is to make the variation value larger for a color parameter whose color changes greatly due to the change in value. Also in this Equation (9), the weighting is performed in such a manner that, the larger the number of pixels N in the block BK1 is, the greater the variation value becomes.

$$R1 = (RG\max - RG\min) \times (N+3) \times 3$$

$$R2 = (L\max - L\min) \times (N+3) \times 4$$

$$R3 = (B\max - B\min) \times (N+3) \times 2$$

$$R4 = (K\max - K\min) \times (N+3) \times 2 \quad (9)$$

Here, R1 represents a variation value of R_G; R2 represents a variation value of L2; R3 represents a variation value of B; R4 represents a variation value of K2; RGmax represents a maximum value of compensation values for R_G in the block BK; RGmin represents a minimum value of compensation values for R_G in the block BK; Lmax represents a maximum value of compensation values for L2 in the block BK; Lmin represents a minimum value of compensation values for L2 in the block BK; Bmax represents a maximum value of compensation values for B in the block BK; Bmin represents a minimum value of compensation values for B in the block BK; Kmax represents a maximum value of compensation values for K2 in the block BK; Kmin represents a minimum value of compensation values for K2 in the block BK; and N represents the number of pixels in the block BK.

A variation value determination portion 115 determines whether or not the obtained variation value for each color parameter is equal to or smaller than a predetermined threshold value. A grouping processing portion 116 performs a process for dividing individual pixels included in the block BK1 into two groups when the variation value is greater than a predetermined threshold value.

A group quantity determination portion 117 determines whether or not the quantity of groups in the block BK1 reaches a target quantity. The details of the processes performed by the variation value determination portion 115, the grouping processing portion 116, and the group quantity determination portion 117 are the same as those already described in the reference example.

Figure 12:
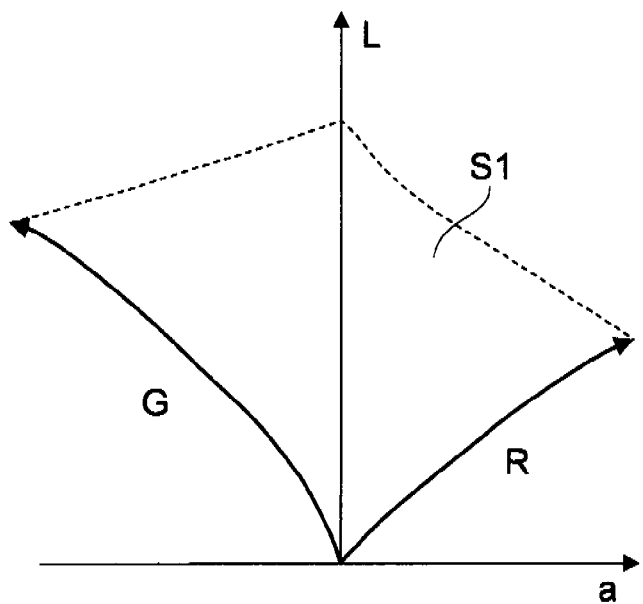
FIG. 12 is a diagram illustrating a relationship between changes in values for R and G in the RGB color space and changes in values for L and a in the Lab color space.

When changes in values in Lab (L*a*b) color space corresponding to changes in values of R and G in RGB color space are plotted on a plane (La plane) passing along L axis and "a" axis, such values are distributed within an area S1 as illustrated in FIG. 12.

Figure 13:
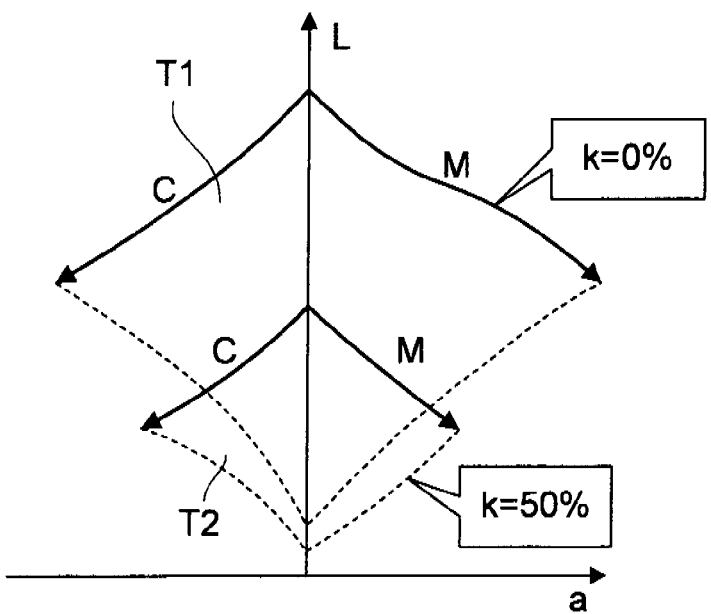
FIG. 13 is a diagram illustrating a relationship between changes in values for C and M in the CMYK color space and changes in values for L and a in the Lab color space.

In contrast, in the case of CMYK color space, changes in values corresponding to changes in values for C and M are distributed on the La plane as illustrated in FIG. 13. Based on what is illustrated in FIG. 13, it can be understood that, as the value for K becomes larger, the distribution range on the La plane changes starting from an area T1, an area T2, and so on while the ratio of the change in value decreases gradually.

It is known that changes in values of individual parameters for L, a, and b in the Lab color space are generally proportional to changes in color which are visually observed. Accordingly, what is illustrated in FIG. 13, i.e., the ratio of the change on the La plane decreases as the value for K increases, indicates that, as the value for K increases, changes in values for C and M are less reflected in a change that is visually observed. This means that the relationship between the changes in values of individual color parameters for CMYK and a change that is visually observed is far remote from the proportional relationship.

In order to suppress the degradation of image quality in the image conversion by the process using BTC, it is necessary to perform grouping in such a way that the pixels whose colors look alike are grouped together so as to replace colors of individual groups with approximated colors. Therefore, it is necessary to take the value for K into account in the case of a CMYK image. To incorporate this idea, according to this embodiment example, the aforementioned Equation (6) is used to perform conversion such that the values of individual color parameters for R, G, and B change in accordance with the value for K.

Here, a description will be given of a case in which the process according to this embodiment example is applied to the block BK2 illustrated in FIG. 14(a).

Figure 14:
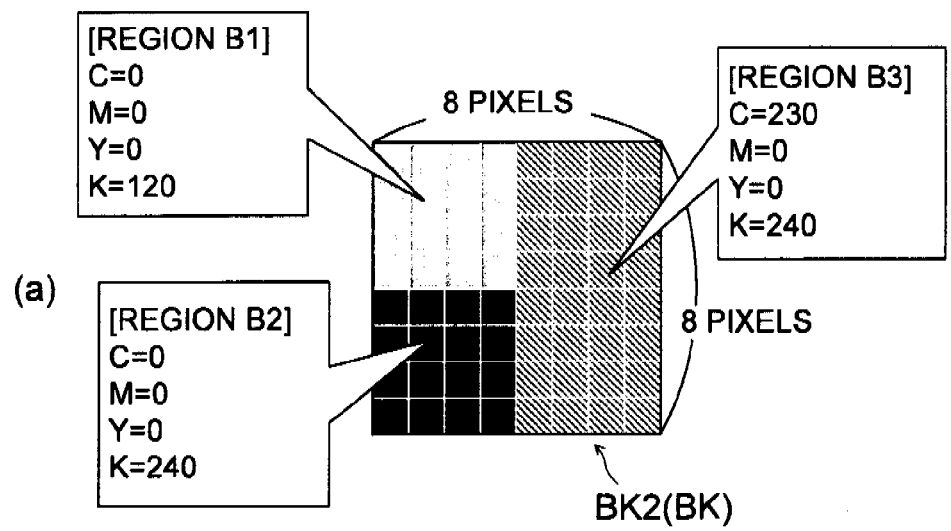
FIG. 14 illustrates an example of the block.
Figure 14:
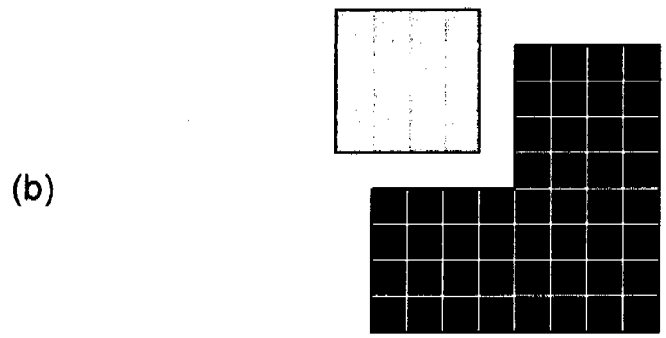
Figure 14:
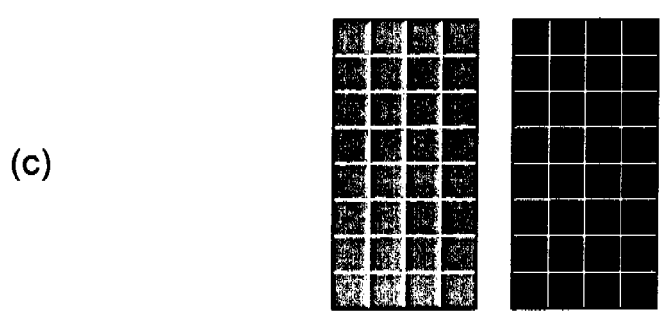

As illustrated in FIG. 14(a), the block BK2 has a size of 8 by 8 matrix of pixels and includes three regions B1, B2, and B3. Each region is formed of pixels having a same color. The values of color parameters for C, M, Y, and K in each region are as depicted in FIG. 14(a).

In this arrangement, firstly, the values in the CMYK color space are converted into values in the RGB color space. When the values for R, G, and B are calculated based on Equation (6), the values in each region depicted in FIG. 15(a) are obtained. In this calculation, the first digit and thereafter after the decimal point is truncated.

When the values for R, G, and B thus obtained are substituted into the right-hand side of Equation (7), values for L, R_G, and B depicted in FIG. 15(b) are obtained for individual regions. According to FIG. 15(b), the values for L in all of the regions do not satisfy the requirements expressed by Equation (3). Therefore, compensation for lightness expressed by Equation (2) is not performed.

Next, the values for K in the regions B1, B2, and B3 are compensated to "30", "60", and "60", respectively, by using Equation (8).

Then, the variation values are obtained based on Equation (9) by using the values for L, R_G, B, and K thus obtained.

According to Equation (9), the variation values for R_G, L, B, and K are calculated as "3015", "36448", "16080", and "4020", respectively. Among these, L, whose variation value is the largest, is chosen as the target parameter.

According to FIG. 15(b), since the maximum and minimum values for L in the block BK2 are "154" and "18", respectively, the threshold value for grouping is determined to be "86", i.e., an intermediate value therebetween.

When the pixels in the block BK2 are divided into a group of pixels having values for L equal to or larger than this threshold value and a group of pixels having values for L smaller than this threshold value, it is possible to divide into a group of pixels included in the region B1 and a group of pixels included in the regions B2 and B3, as illustrated in FIG. 14(b).

In the case of a CMYK image, even if the changes in values for C, M, and Y are large, the change in visually observed color becomes small for an image having a large value for K. However, if the changes in values for C, M, and Y are large, the grouping such as the one illustrated in FIG. 14(c) has been sometimes performed conventionally, regardless of how the change in color is visually observed.

However, if the method according to this embodiment example is applied, it is possible to perform appropriate grouping in response to the visually observed color and, as compared with the conventional way, suppress the degradation in image quality which would otherwise be caused by using BTC, because the value for K is taken into account.

In this embodiment, a description has been given of a case in which the threshold value for grouping is obtained based on the histogram. However, it is also possible to use, as the threshold value, the intermediate value, average value, or the like of the target parameter within a group.

In this embodiment, variation values are obtained for the values in the color space of L, R_G, and B for grouping. However, it is also possible to obtain the variation values for the values in RGB color space.

It is to be noted that it is also possible to perform the process using BTC according to this embodiment by such a device as the computer 11 other than the printer 13.

Finally, the configuration and functions of all or part of the print system 1 and printer 13, the target quantity, individual threshold values, the details expressed by data, details or order of the processing performed thereby, and so on can be modified in various ways within the spirit of the present invention.

The invention claimed is:

1. An image processing method by which each small area including pixels within a color image is expressed by a predetermined or smaller number of representative colors, the method comprising:
an obtaining step for obtaining values of individual color parameters for cyan, magenta, yellow, and black by which each pixel is expressed;
a value calculation step for obtaining values of individual post-conversion color parameters from the values of the individual color parameters for cyan, magenta, yellow, and
black, the values of the individual post-conversion color parameters each having a degree of variation being compensated to become smaller as the value of the color parameter for black becomes larger;
a selection step for selecting one post-conversion color parameter to be targeted with respect to the pixels included in the small area based on variation values, which indicate
degrees of variation in the small area, of the values of the individual post-conversion color parameters obtained in the value calculation step;
a reference value calculation step for obtaining a reference value to be used for grouping the pixels based on the value of the post-conversion color parameter to be targeted in the small area;
a grouping step for grouping the pixels included in the small area based on the reference value obtained in the reference value calculation step; and
a representative color calculation step for obtaining a representative color for each group in the small area based on the values of the individual color parameters for pixels belonging to said each group.

2. The image processing method according to claim 1, wherein, in the reference value calculation step, if there is a specific value of a post-conversion color parameter whose corresponding quantity of pixels is "0" in a relationship between the values of the post-conversion color parameter to be targeted and quantities of pixels in the small area, the
relationship covering a minimum value through to a maximum value of the post-conversion color parameter to be targeted, said specific value is obtained as the reference value.

3. The image processing method according to claim 2, further comprising:
a second selection step for selecting a group to be targeted and a post-conversion color parameter to be targeted based on variation values in each group of the small area with
respect to the values of the individual post-conversion color parameters obtained in the value calculation step;
a second reference value calculation step that, if there is a particular value of a post-conversion color parameter whose corresponding quantity of pixels is "0" in a relationship between the values of the post-conversion color parameter to be targeted and quantities of pixels in the group to be targeted, the relationship covering a minimum value through to a maximum value of the post-conversion color parameter to be targeted, said particular value is obtained as a second reference value; and
a second grouping step for grouping the pixels included in the group to be targeted based on the second reference value obtained in the second reference value calculation step,
wherein, in the representative color calculation step, the representative color is obtained for each group in the small area after the second grouping step is performed.

4. The image processing method according to claim 3, wherein, in the selection step and the second selection step, the variation values are obtained by performing weighting in such a way that the variation values become larger for a post-conversion color parameter whose color changes greatly as a result of a change in a value of the post-conversion color parameter, and said selecting is performed based on the variation values thus obtained.

5. The image processing method according to claim 4, wherein, in the second selection step, the variation values are obtained, for each group in the small area, by performing weighting in such a way that the variation values become larger as a quantity of pixels in the group becomes larger, and said selecting is performed based on the variation values thus obtained.

6. The image processing method according to claim 5, wherein, in the reference value calculation step and the second reference value calculation step, if there is no specific value of a post-conversion color parameter whose corresponding quantity of pixels is "0" in a relationship, covering the minimum value through to the maximum value of the post-conversion color parameter to be targeted, between the values of the post-conversion color parameter to be targeted and quantities of pixels in the group to be targeted, a value closest to a center value between the maximum and minimum values is obtained as the reference value.

7. The image processing method according to claim 3, wherein the second selection step, the second reference value calculation step, and the second grouping step are repeated for the small area until a quantity of the groups in the small area becomes a predetermined quantity.

8. The image processing method according to claim 7, wherein, if all of the variation values of the individual post-conversion color parameters in each group in the small area are equal to or smaller than a predetermined threshold value, the representative color calculation step is performed by skipping the grouping that is performed in the grouping step and the second grouping step even if the quantity of the groups in the small area is smaller than the predetermined quantity.

9. The image processing method according to claim 1, wherein, in the reference value calculation step, if there are a plurality of values of a post-conversion color parameter whose corresponding quantity of pixels is "0" in a relationship between the values of the post-conversion color parameter to be targeted and quantities of pixels in the group, a value closest to a center value between the maximum and minimum values of the post-conversion color parameter in the group is obtained as the reference value.

10. The image processing method according to claim 1, wherein a center value of the values of the post-conversion color parameter to be targeted in the group is obtained as the reference value.

11. The image processing method according to claim 1, wherein an average value of the values of the post-conversion color parameter to be targeted in the group is obtained as the reference value.

12. An image processing apparatus performing image processing in which each small area including pixels within a color image is expressed by a predetermined or smaller number of representative colors, the image processing apparatus comprising:
an obtaining portion that obtains values of individual color parameters for cyan, magenta, yellow, and black by which each pixel is expressed;
a value calculation portion that obtains values of individual post-conversion color parameters from the values of the individual color parameters for cyan, magenta, yellow, and black, the values of the individual post-conversion color parameters each having a degree of variation being compensated to become smaller as the value of the color parameter for black becomes larger;
a selection portion that selects one post-conversion color parameter to be targeted with respect to the pixels included in the small area based on variation values, which indicate degrees of variation in the small area, of the values of the individual post-conversion color parameters obtained in the value calculation portion;
a reference value calculation portion that obtains a reference value to be used for grouping the pixels based on the value of the post-conversion color parameter to be targeted in the small area;
a grouping portion that groups the pixels included in the small area based on the reference value obtained by the reference value calculation portion; and
a representative color calculation portion that obtains a representative color for each group in the small area based on the values of the individual color parameters for pixels belonging to said each group.

13. An image data compression apparatus for compressing color image data expressed by cyan, magenta, yellow, and black, the image data compression apparatus comprising:
a dividing portion that divides the image data into a plurality of small areas;
a value calculation portion that obtains values of individual post-conversion color parameters from the values of the individual color parameters for cyan, magenta, yellow, and black, the values of the individual post-conversion color parameters each having a degree of variation being compensated to become smaller as the value of the color parameter for black becomes larger;
a selection portion that selects one post-conversion color parameter to be targeted with respect to the pixels included in the small area based on variation values, which indicate degrees of variation in the small area, of the values of individual post-conversion color parameters obtained by the value calculation portion;
a reference value calculation portion that obtains a reference value to be used for grouping the pixels based on the value of the post-conversion color parameter to be targeted in the small area;
a grouping portion that groups the pixels included in the small area based on the reference value obtained by the reference value calculation portion:
a representative color calculation portion that obtains a representative color for each group in the small area based on the values of the individual color parameters for pixels belonging to said each group; and
a compressed data generation portion that generates compressed data of the image data by using the representative color obtained by the representative color calculation portion
on each of the plurality of small areas included in the image data.

14. A computer program product stored on a tangible computer readable medium containing instructions executable by a computer for causing, when executed by a computer, a computer to perform a process by which each small area including pixels within a color image is expressed by a predetermined or smaller number of representative colors, the process comprising:

an obtaining step for obtaining values of individual color parameters for cyan, magenta, yellow, and black with which each pixel is expressed;

a value calculation step for obtaining values of individual post-conversion color parameters from the values of the individual color parameters for cyan, magenta, yellow, and black, the values of the individual post-conversion color parameters each having a degree of variation being compensated to become smaller as the value of the color parameter for black becomes larger;

a selection step for selecting one post-conversion color parameter to be targeted with respect to the pixels included in the small area based on variation values, which indicate degrees of variation in the small area, of the values of the individual post-conversion color parameters obtained in the value calculation step;

a reference value calculation step for obtaining a reference value to be used for grouping the pixels based on the value of the post-conversion color parameter to be targeted in the small area;

a grouping step for grouping the pixels included in the small area based on the reference value obtained in the reference value calculation step; and a representative color calculation step for obtaining a representative color for each group in the small area based on the values of the individual color parameters for pixels belonging to said each group.

* * * * *